Oct. 2, 1928.
W. D. KYLE
1,686,216
INSULATING RACK
Original Filed Nov. 17, 1923
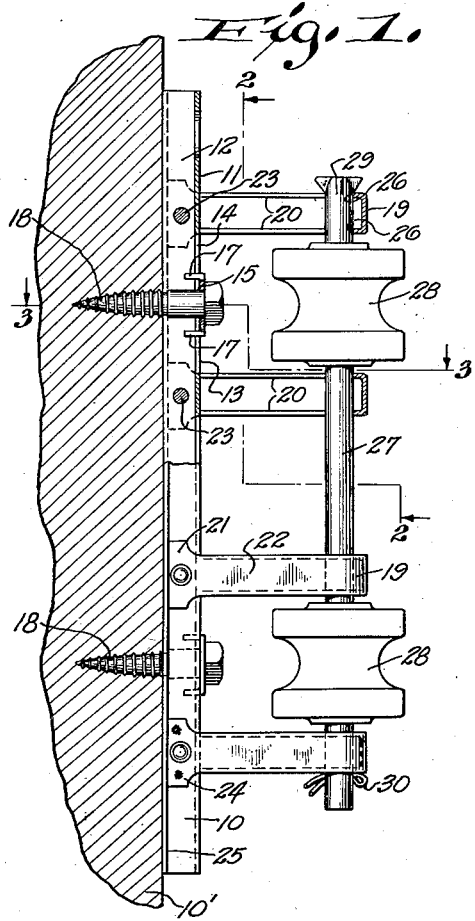
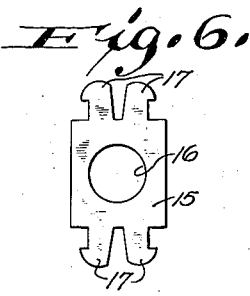
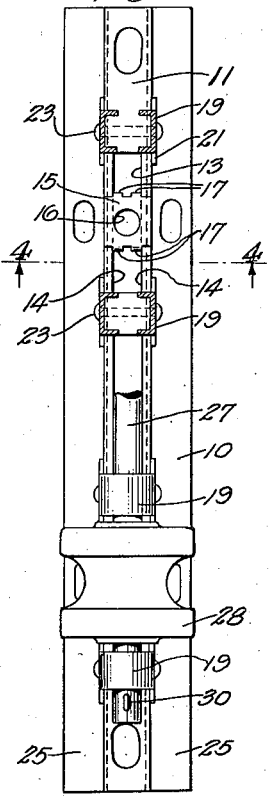
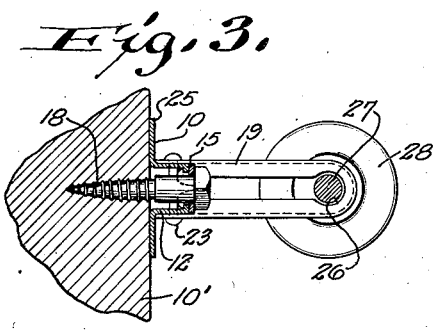
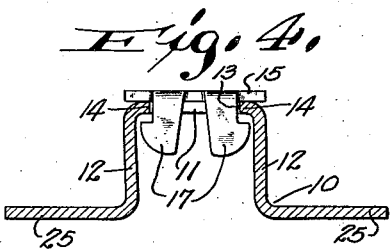
WITNESSES
INVENTOR.
William D. Kyle
BY
ATTORNEY.

Patented Oct. 2, 1928.

1,686,216

UNITED STATES PATENT OFFICE.

WILLIAM D. KYLE, OF MILWAUKEE, WISCONSIN, ASSIGNOR TO LINE MATERIAL COMPANY, OF SOUTH MILWAUKEE, WISCONSIN, A CORPORATION OF WISCONSIN.

INSULATING RACK.

Original application filed November 17, 1923, Serial No. 675,317. Divided and this application filed July 12, 1926. Serial No. 121,884.

The invention relates to insulating racks.

One of the objects of the invention is to provide an insulating rack in which the washers for the attaching screws or bolts are movably mounted on the rack adjacent apertures in the base member thereof in readiness for the attachment of the rack, thereby replacing the usual plain washers which frequently become lost or misplaced before they can be used and are inconvenient for purposes of shipping and mounting the rack.

The invention further consists in the several features hereinafter set forth and more particularly defined by claims at the conclusion hereof.

This case constitutes a division of my application Serial No. 675,317, filed November 17, 1923, for insulating racks.

In the drawings: Fig. 1 is a side elevation view of a rack embodying the invention, parts being broken away and parts being shown in section;

Fig. 2 is a front view of the rack shown in Fig. 1, parts being shown in section on the line 2—2 of Fig. 1;

Fig. 3 is a sectional view taken on the line 3—3 of Fig. 1;

Fig. 4 is a transverse sectional view of the base member, taken on the line 4—4 of Fig. 2, showing the washer in place;

Fig. 5 is a perspective view of the washer before applying it to the base member; and Fig. 6 is a detail view of the washer blank before being bent into the shape shown in Fig. 5.

The rack includes a base member 10 of channel form in which the web portion 11 spaced from the rack support 10' by flanges 12 is provided with longitudinally extending slots 13. At the sides of the slots 13, the web portion 11 forms inwardly projecting lips 14.

A metal plate 15 of rectangular shape has a central opening 16 and opposite pairs of spaced hooked projections 17 bent at right angles to extend through the slot 13 and loosely engage the underside of the lips 14 of the base member, as best seen in Fig. 4.

To insert the washer 15 in the slot 13, it is bowed about its longitudinal axis to shorten the distance between the ends of the hooked projections as seen in Fig. 5, whereupon they can be passed through the slot. The washer is then flattened by a hammer blow or other method to spread the hooked projections beyond the edges of the slot and adjacent the inwardly projecting lips 14. The washer is thus held against withdrawal from the rack and against relative rotation with respect thereto, but may be moved longitudinally in the slot to any desired location at which it is convenient to place the attaching screw 18.

A U-shaped channel member or bracket 19 with inturned flanges 20 has the widened ends 21 of its web portions 22 extending beyond the flanges and secured in abutment with the outside of the flanged portions 12 of the base member 10 by rivets 23 passing through the channel portion, or by spot welding 24 or both.

In order to maintain the bracket in rigid relation to the base member the ends of the inturned flanges 20 abut against the web portion 11 of the base member and the edges of the end portions 21 of the bracket 19 abut against side portions 25 of the base member. The side portions 25, however, may be omitted in some instances, leaving a simple channel form of base member.

Each bracket has alined openings 26 at its outer end receiving a rod 27 upon which the spool insulators 28 are mounted. As shown, this rod passes through all the brackets on the base, its headed end 29 abutting against the inturned flanges 20 adjacent the opening in the uppermost bracket and its other end apertured to receive a cotter pin 30. As shown, an insulator 28 is mounted between each pair of brackets, but it will be understood that other insulators may be mounted between the brackets and the rod may be extended beyond the bracket at either end of the rack to take an insulator.

As the slots 13 are formed in portions of a base member spaced from the rack support 10', the washers 15 are free to move therein when the base member abuts against the support. These slots may be long enough to provide a wide range of position for the attaching screws without affecting the secure anchorage of the brackets 20 to the base member, as the brackets are secured to the outside of the flanges of the base member.

What I claim as new and desire to secure by Letters Patent is:

1. In an insulating rack, the combination of a base member adapted to abut against a support and having portions spaced from said support and provided with a slot, and an apertured washer plate movably mounted in said slot against withdrawal from said base member for receiving therethrough and thereagainst a fastening member adapted to enter said support.

2. In an insulating rack, the combination of an insulator-carrying channel base member adapted to abut against a support with its web portion spaced therefrom and provided with openings in said web portion including a slot, and an apertured washer plate slidably mounted in said slot against withdrawal from said base member for receiving a fastening member adapted to enter said support.

3. In an insulating rack, the combination of an insulator-carrying channel base member adapted to abut against a support with its web portion spaced therefrom and provided with a slot, and a bendable apertured washer plate slidably mounted in said slot for receiving therethrough a fastening member adapted to enter said support, said plate having portions loosely engageable with the edges of the slot to prevent withdrawal of the plate.

4. In an insulating rack, the combination of an insulator-carrying channel base member adapted to abut against a support with its web portion spaced therefrom and provided with a slot, and an apertured washer plate slidably mounted in said slot for receiving a fastening member adapted to enter said support, said plate having opposite pairs of hooked projections for loosely engaging the edges of the slot and for preventing relative rotation of the plane with respect to the base member and said plate being bendable longitudinally to pass said projections through said slot.

5. In an insulating rack, the combination of a base member adapted to abut against a support and having a slot, and an apertured washer plate slidably mounted in said slot against withdrawal from said base member for receiving therethrough a fastening member securing said base member against said support.

6. In an insulating rack, the combination of a base member adapted to abut against a support and provided with a slot, and an apertured washer plate slidably mounted in said slot against withdrawal for receiving therethrough a fastening member adapted to enter said support, said plate having a pair of complementary hooked projections at each of opposite ends extending laterally from the general plane of the plate to present hooks loosely engageable with the edges of the slot.

7. In an insulating rack, the combination of a base member adapted to abut against a support and including spaced parallel side portions the outer lateral edges of which are inturned to form lips arranged in the same plane and defining a longitudinally-extending slot between them, and an apertured washer plate slidably bearing on the outer faces of said lips and including opposite hooked portions loosely embracing said lips to guide said plate member for movement along said slot and to prevent the withdrawal of said plate from the base member.

In testimony whereof, I affix my signature.

WILLIAM D. KYLE.